(12) United States Patent
Satake (10) Patent No.: US 11,790,199 B2
(45) Date of Patent: Oct. 17, 2023

(54) PRINTING APPARATUS, CONTROL METHOD, AND STORAGE MEDIUM

(71) Applicant: CANON KABUSHIKI KAISHA, Tokyo (JP)

(72) Inventor: Makoto Satake, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 406 days.

(21) Appl. No.: 17/156,715

(22) Filed: Jan. 25, 2021

(65) Prior Publication Data

US 2021/0232874 A1    Jul. 29, 2021

(30) Foreign Application Priority Data

Jan. 29, 2020 (JP) ................................. 2020-012602

(51) Int. Cl.
  *G06K 15/02*    (2006.01)
(52) U.S. Cl.
  CPC ....... *G06K 15/021* (2013.01); *G06K 15/1822* (2013.01)
(58) Field of Classification Search
  None
  See application file for complete search history.

(56) References Cited

U.S. PATENT DOCUMENTS

| | | | | |
|---|---|---|---|---|
| 2001/0046057 A1* | 11/2001 | Kimura | ................... | B41J 3/4071 358/1.8 |
| 2004/0021907 A1* | 2/2004 | Truc | ....................... | G11B 23/40 40/340 |
| 2007/0109601 A1* | 5/2007 | Mitani | ........................ | B41J 3/44 358/1.18 |
| 2008/0030747 A1* | 2/2008 | Shingai | .............. | H04N 1/33315 358/1.1 |
| 2009/0237704 A1* | 9/2009 | Minowa | ................. | B41J 3/4071 358/1.14 |
| 2010/0165408 A1* | 7/2010 | Abe | ...................... | G06K 15/021 345/682 |

FOREIGN PATENT DOCUMENTS

| | | | | |
|---|---|---|---|---|
| JP | 2007-122279 | * | 5/2007 | ............. B41J 21/00 |
| JP | 2007-122279 A1 | | 5/2007 | |

* cited by examiner

*Primary Examiner* — Miya J Cato
*Assistant Examiner* — Pawan Dhingra
(74) *Attorney, Agent, or Firm* — VENABLE LLP (57) ABSTRACT

A printing apparatus prints on print media including a paper medium and a special print medium other than the paper medium. The printing apparatus includes an analysis unit that analyzes a print job, and a determination unit that determines whether or not the print job is a job to cause execution of printing on the special print medium, based on a result of analysis by the analysis unit. Based on the determination by the determination unit that the print job is the job to cause execution of printing on the special print medium, an operation manual in a case of printing on the special print medium is printed on the paper medium. After the operation manual is printed, the printing on the special print medium is executed based on a premise that a prescribed operation is carried out by a user.

16 Claims, 6 Drawing Sheets

12 Set printable disk on the multipurpose tray
  ❶ Press the lower part of the printable disk against the stopper (❶) with the printing surface facing up.

❷ Press down the stopper with the printable disk and insert the upper part of the printable disk into the slits (❷) on the multipurpose tray.

⋙ IMPORTANT
  ● Set the disk after checking that no grit or dust is on the multipurpose tray.
  ● When setting the printable disk, do not touch the printing surface of the printable disk or the reflector plates (❸) on the multipurpose tray.

13 Insert the disk horizontally until the arrows ( ⊼ ) on the multipurpose tray are almost aligned with the arrows ( ⊻ ) on the multipurpose tray guide.

⋙ IMPORTANT
Do not push the multipurpose tray so deep that the arrows ( ⊻ ) on the multipurpose tray go beyond the arrows ( ⊼ ) on the multipurpose tray guide.

14 Press the OK button
  ● The multipurpose tray is dragged in and printing is started

```
  DISK ON MULTIPURPOSE TRAY
  [OK] START PRINTING
  ```

15 Pull the multipurpose tray and take the disk out when the printing is completed.

FIG.6

PRINTING APPARATUS, CONTROL METHOD, AND STORAGE MEDIUM

BACKGROUND OF THE INVENTION

Field of the Invention

The present invention relates to a printing apparatus equipped with a function to print on a special print medium such as a CD and a DVD other than paper, and configured to print an operation manual that explains an operating method for this function.

Description of the Related Art

There has heretofore been known a printing apparatus such as a printer and a multifunction peripheral (hereinafter MFP), which is equipped with a mechanism for printing on a special print medium such as a CD and a DVD other than paper and is thus capable of printing on the special print medium. Generally, in the case of printing on the special print medium, the print medium is mounted on a dedicated tray instead of a conveyance mechanism for the paper due to a high rigidity of the print medium, and the print medium is printed while conveying the dedicated tray. In this case, the printing is carried out in accordance with an operating method that is different from an operating method for printing on paper. A user who does not have many opportunities to print on the special print medium may poorly understand the operating method applicable thereto. Given the situation, as a remedy for furnishing such a user with the operating method applicable to the case of printing on the special print medium, a booklet of an operation manual may be attached to the printing apparatus or an equivalent electronic manual may be uploaded on a Web site, for example.

In the meantime, there has been known a system configured to demonstrate an operating method applicable to a case of printing on a special print medium to a user in the form of an application program of a host computer or an information processing terminal such as a smartphone in synchronization with a printing apparatus while using illustrations and sentences. Japanese Patent Laid-Open No. 2007-122279 (hereinafter referred to as Reference 1) discloses a printing apparatus, which is configured to store operation manual data in the printing apparatus in advance so as to display the contents of the manual on a large display unit or to print out the manual on a paper medium in response to an operation by a user.

In the case of providing the manual booklet or the electronic manual as described above or in the case of displaying the operation manual as disclosed in Reference 1, the user needs to recognize the existence of these manuals and to refer to the manuals. However, if the user does not recognize the existence of the manuals very well, then the user may fail in referring to the manuals and understanding the operation for printing on the print medium as mentioned above.

SUMMARY OF THE INVENTION

An aspect of the present invention provides a printing apparatus configured to print on print media including a paper medium and a special print medium other than the paper medium, which includes an analysis unit configured to analyze a print job, and a determination unit configured to determine whether or not the print job is a job to cause execution of printing on the special print medium, the determination being made based on a result of analysis by the analysis unit. Here, based on the determination by the determination unit that the print job is the job to cause execution of printing on the special print medium, an operation manual in a case of printing on the special print medium is printed on the paper medium, and after the operation manual is printed, the printing on the special print medium is executed based on a premise that a prescribed operation is carried out by a user.

Further features of the present invention will become apparent from the following description of exemplary embodiments with reference to the attached drawings.

DESCRIPTION OF THE EMBODIMENTS

An embodiment of the present invention will be described below in detail with reference to the drawings. It is to be noted that features, relative arrangements, and the like concerning the constituents described in the following are not intended to restrict the scope of the present invention unless otherwise specifically stated therein.

<Printing Apparatus 100>

Figure 1:
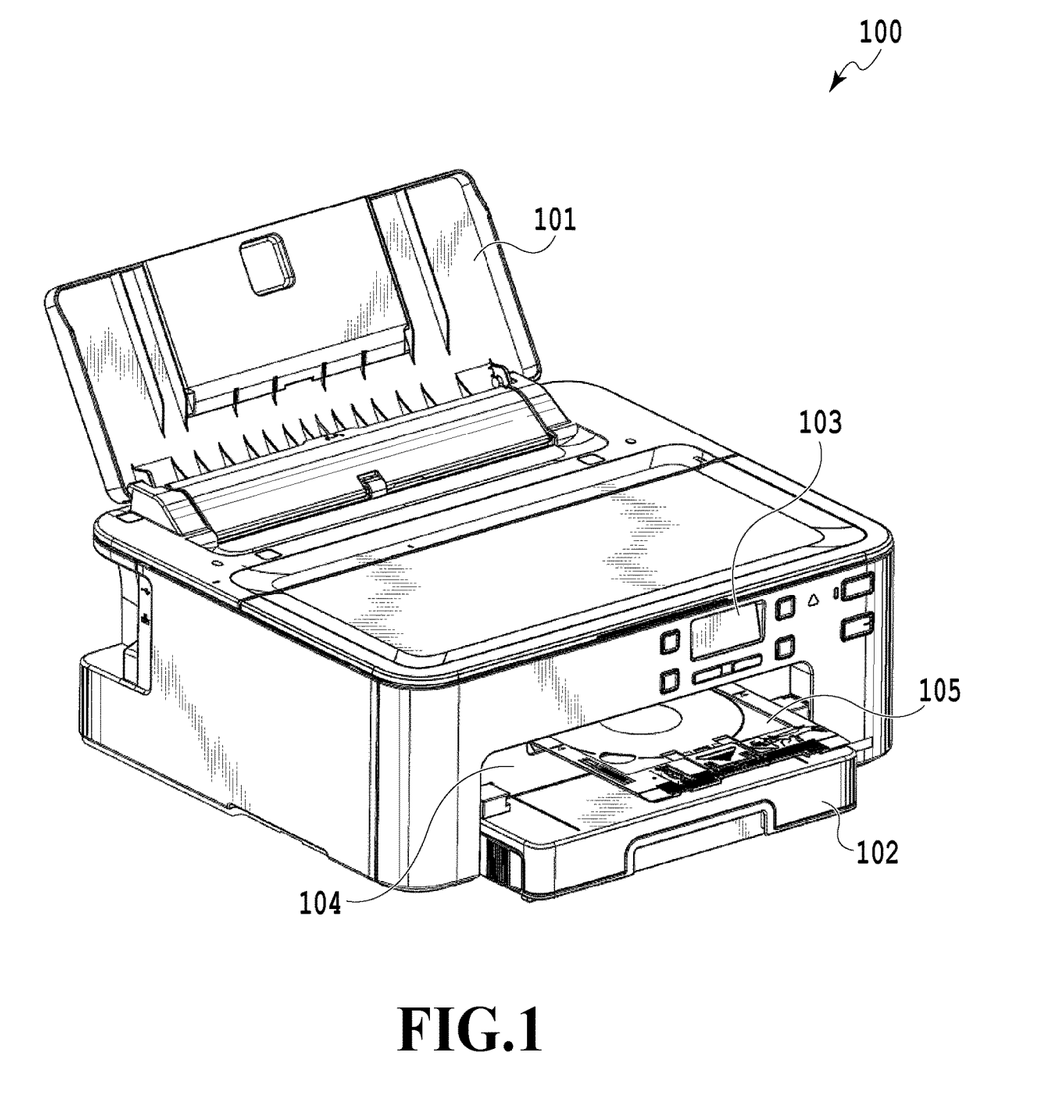
FIG. 1 is a perspective view showing external appearance of a printing apparatus 100.

A printing apparatus 100 according to an embodiment of the present invention will be described below in detail with reference to FIG. 1. FIG. 1 is a perspective view of an external appearance of the printing apparatus 100. The printing apparatus 100 includes an automatic sheet feeder (ASF) tray 101, a sheet feeding cassette 102, a liquid crystal display (LCD) unit 103, a sheet discharge tray 104, a CD tray 105, and so forth. The CD tray 105 is a tray that can mount a disk-shaped print medium such as a CD. The disk-shaped print medium is subjected to printing while conveying this CD tray 105 as described later. Note that the disk-shaped print medium is not limited only to the CD. A DVD or the like may also be used as the disk-shaped print medium.

In the case of executing CD label printing according to the embodiment of the present invention, the sheet discharge tray 104 has to be pushed into a CD label print position and the CD tray 105 has to be inserted into a correct position on the sheet discharge tray 104. In this state, it is not possible to print on a paper medium because a conveyance route for the paper medium is mechanistically blocked. Accordingly, the CD tray 105 needs to be taken out and the sheet discharge tray 104 needs to be pulled in the case of printing on the paper medium from this situation.

<Hardware Configuration of Printing Apparatus 100>

Figure 2:
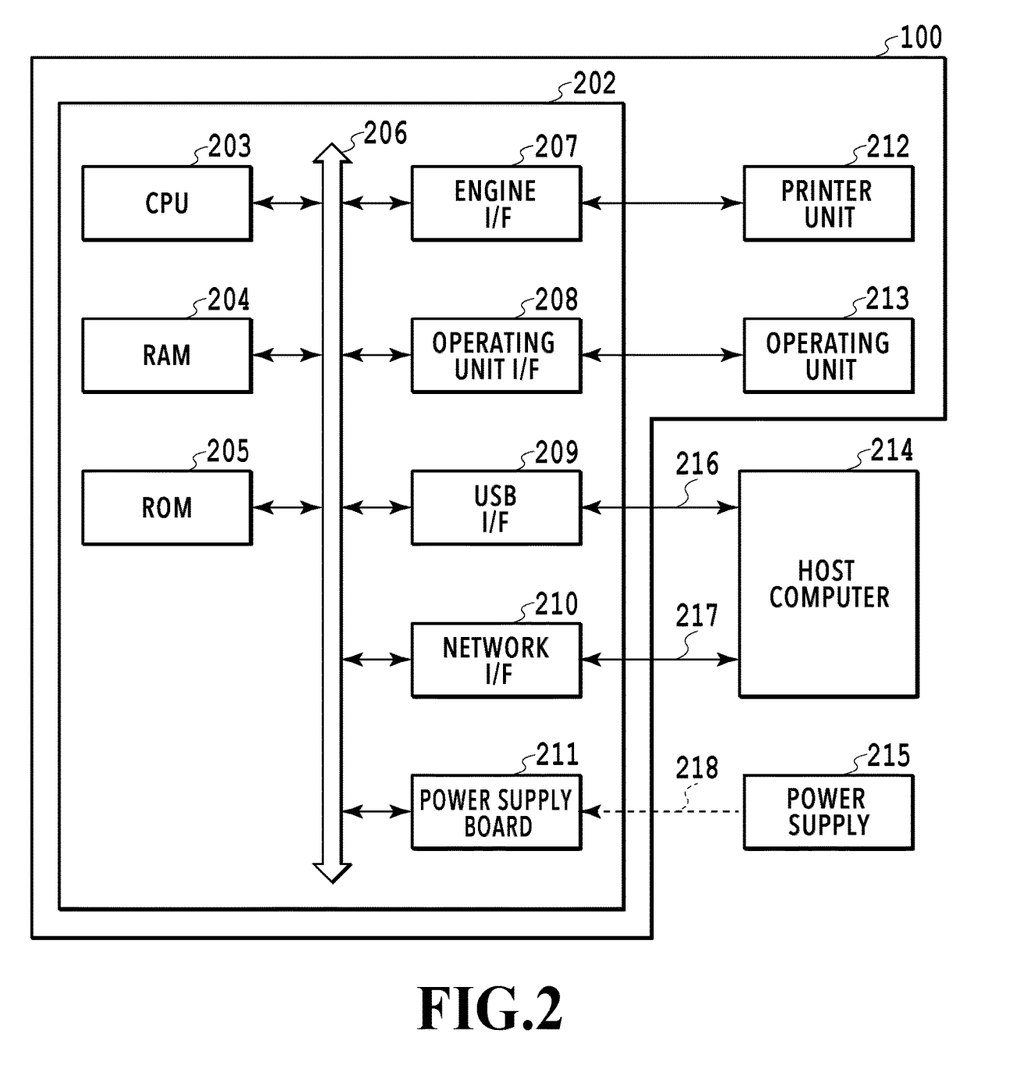
FIG. 2 is a block diagram of a hardware configuration of the printing apparatus 100.

A hardware configuration of the printing apparatus 100 according to the embodiment of the present invention will be described below with reference to FIG. 2. FIG. 2 is a block diagram showing the hardware configuration of the printing apparatus 100.

The printing apparatus 100 includes a control unit 202. The control unit 202 includes a CPU 203, a RAM 204, a ROM 205, a control bus 206, an engine interface (engine I/F) 207, an operating unit I/F 208, a USB I/F 209, a network I/F 210, and a power supply board 211. In the meantime, the respective components of the control unit 202 are connected to one another through the control bus 206 and are capable of transmitting and receiving data to and from one another.

The CPU 203 loads control programs stored in the ROM 205 into the RAM 204 and performs a variety of control including power-on control, printing control, and the like while reading the control programs as appropriate.

The RAM 204 is a main storage memory for the CPU 203, which is used as a work area and a temporary storage area for loading the various programs stored in the ROM 205.

The ROM 205 stores image data, various programs, and a variety of setting information. In the embodiment of the present invention, data on an operation manual for clearly demonstrating CD label printing procedures to a user is stored in the ROM 205. However, this embodiment assumes a case where the CPU 203 cannot store the entire data of the operation manual in the ROM 205 due to a small capacity of the ROM 205. For this reason, of the operation manual, only the data corresponding to a portion describing procedures that require complicated operations is stored in the ROM 205. For example, as the CD label printing procedures, the operation manual describes how to correctly insert the CD tray 105 into an insertion slot of the sheet discharge tray 104 after moving the sheet discharge tray 104 to a CD label printing position, and the like. Here, a flash storage or the like is used as the ROM 205. However, an auxiliary storage device such as a hard disk may be used instead of the flash storage.

Although the printing apparatus 100 is configured such that the single CPU 203 executes a variety of processing to be described later by using the single memory (RAM 204), the present invention is not limited only to this mode and other modes may be applied instead. For example, the variety of processing to be described later may be executed by using multiple CPUs as well as multiple RAMs, ROMs, and storages in cooperation. Alternatively, part of such processing may be executed by using a hardware circuit.

The engine I/F 207 connects a printer unit 212 to the respective components of the control unit 202. Image data to be printed by the printer unit 212 is transferred from the control unit 202 to the printer unit 212 through the engine I/F 207, and is printed on the print medium in the printer unit 212. The printer unit 212 includes a sensor for detecting the position of the sheet discharge tray 104.

The operating unit I/F 208 connects an operating unit 213 to the respective components of the control unit 202. The operating unit 213 includes a liquid crystal display unit having a touch panel function, operating keys, and the like and functions as a reception unit that receives an instruction from a user. In the embodiment of the present invention, the user performs a setting as to whether or not a print setting of a CD label print operation manual is valid or invalid by using the operating unit 213, and the CPU 203 stores resultant setting values in the ROM 205.

The printing apparatus 100 communicates with a host computer 214 through a combination of the USB I/F 209 and a USB cable 216 or a combination of the network I/F 210 and a network cable 217.

The power supply board 211 transforms a voltage of electric power supplied from a power supply 215 through a power supply cable 218 and supplies the transformed power to the printing apparatus 100. Here, the power supply board 211 may be provided with a storage battery that can store the electric power.

<Conceptual Diagram of Structure Data>

Figure 3:
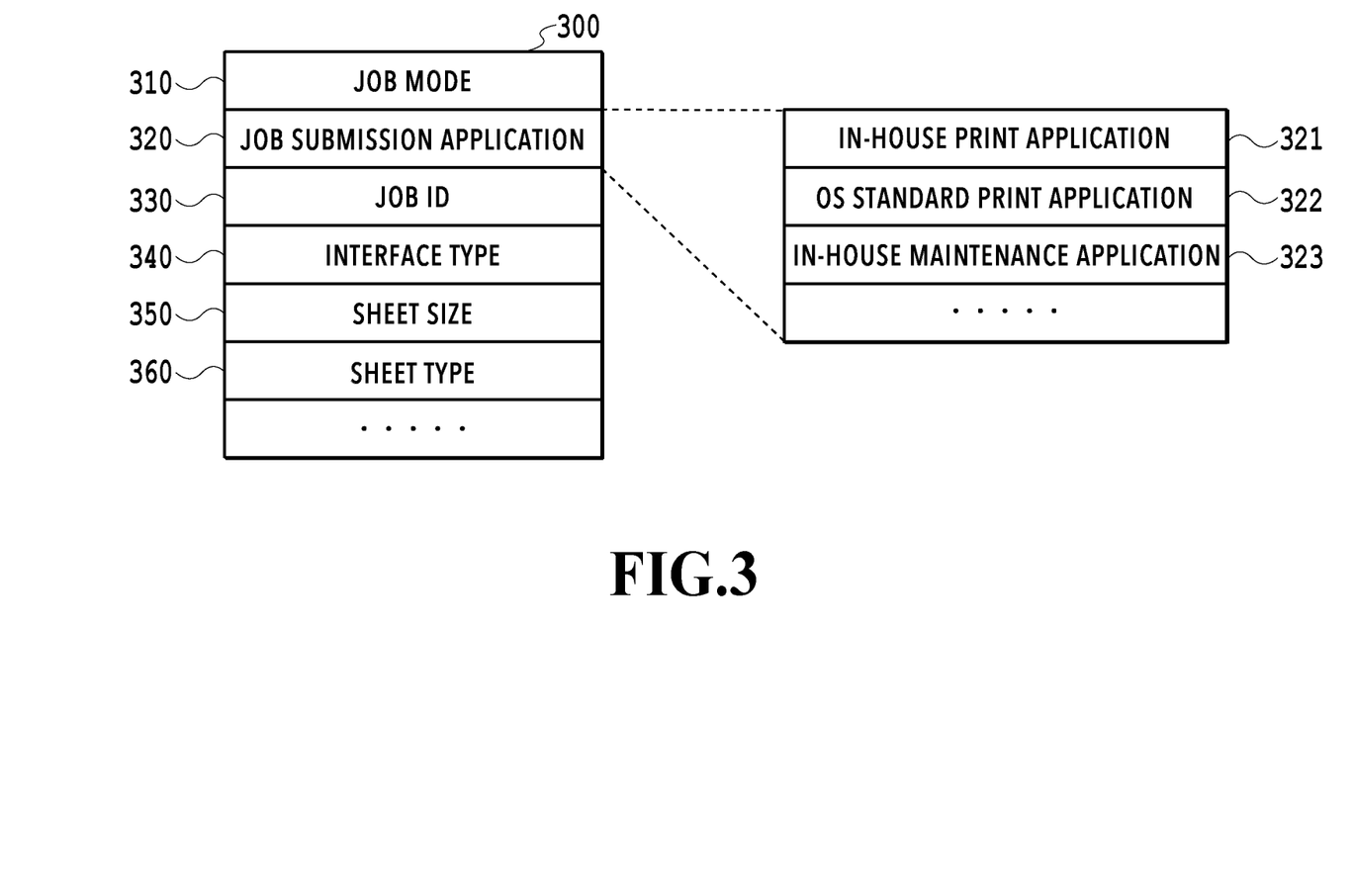
FIG. 3 is a conceptual diagram of structure data for managing attribute information on a print job.

Structure data for managing attribute information on a print job in the embodiment of the present invention will be described below with reference to FIG. 3. FIG. 3 is a conceptual diagram of the structure data for managing the attribute information on the print job. Here, the print job is a data set that includes print data described in a page description language (PDL) and a print setting thereof.

In a case where the host computer 214 shown in FIG. 2 transmits a print job to the printing apparatus 100, the CPU 203 in the printing apparatus 100 receiving the print job analyzes the print job. Then, the CPU 203 generates job management data 300 based on a result of analysis of the print job. The generated job management data 300 is stored in the RAM 204.

A print mode of the print job such as a PC print mode, a maintenance mode, and a self print mode is set to a job mode 310.

An application program type is set to a job submission application 320. Examples of the application program type include an in-house print application 321 originating from a printer manufacturer, an OS standard print application 322 that operates in an environment utilizing each OS standard universal printer driver, an in-house maintenance application 323 that instructs execution of cleaning, and the like. This embodiment is configured to determine whether or not it is appropriate to print the CD label print operation manual depending on whether or not a parameter of the job submission application 320 indicates the application program originating from the printer manufacturer (such as the in-house print application 321).

An ID for identifying the job is set to a job ID 330.

A type of an interface that connects the host computer 214 to the printing apparatus 100, such as USB, wired LAN, and wireless LAN interfaces and the like, is set to an interface type 340.

A sheet size such as A4, post card, and 3R is set to a sheet size 350.

A type of print paper of a print target such as plain paper, glossy paper, and a CD label is set to a sheet type 360. This embodiment relates to print control in the case where the sheet type 360 is the CD label.

<Print Processing Executed by Printing Apparatus 100>

Figure 4:
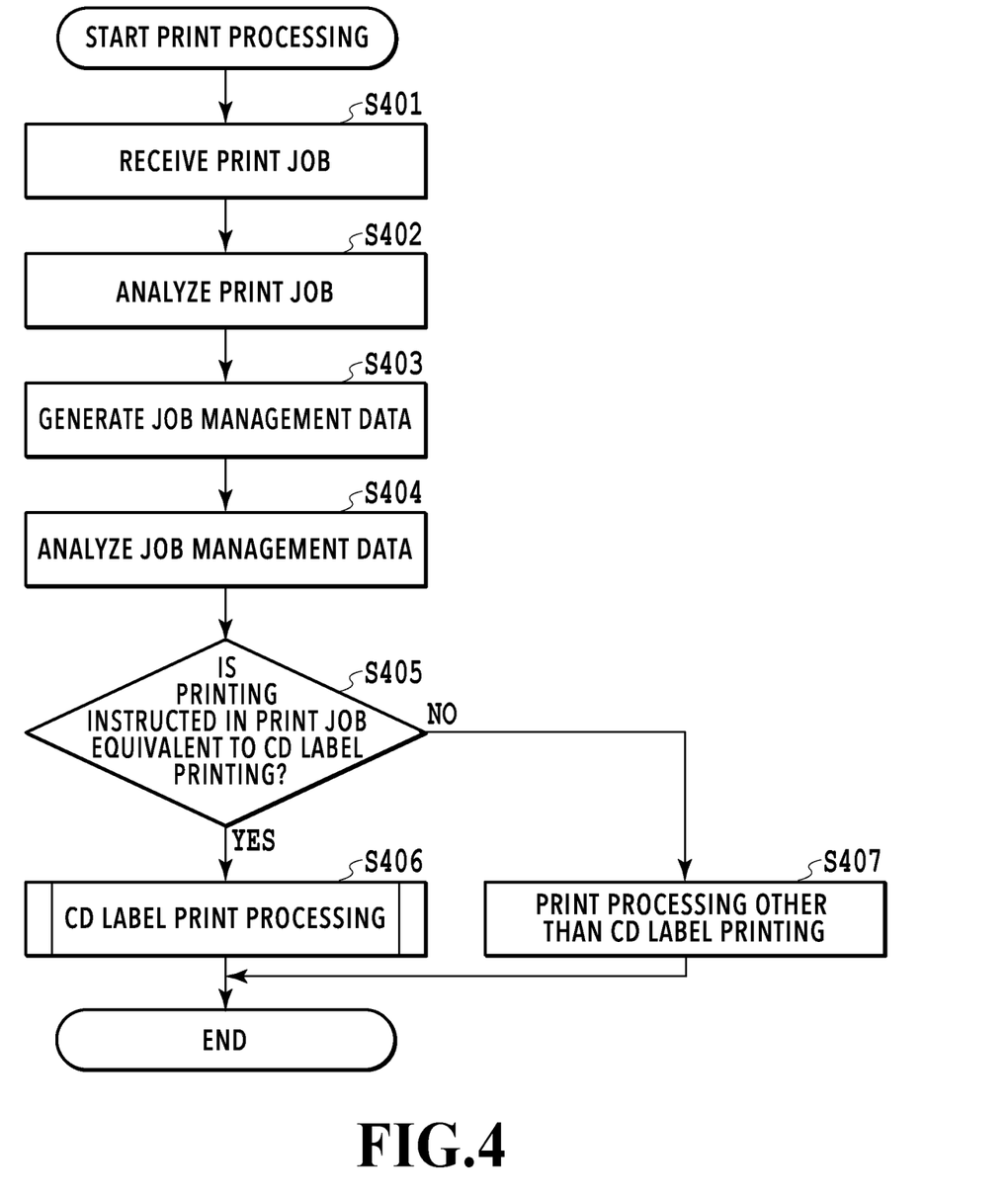
FIG. 4 is a flowchart of print processing.

Print processing in the embodiment of the present invention will be described below with reference to FIG. 4. FIG. 4 is a flowchart in a case where the printing apparatus 100 receives the print job transmitted from the host computer or the information processing terminal such as the smartphone, and performs print processing on the print medium loaded on the ASF tray 101, the sheet feeding cassette 102, or the CD tray 105.

In step S401, the printing apparatus 100 receives the print job, which is transmitted from the host computer 214, through the USB I/F 209 or the network I/F 210. In the following, each "step SXXX" will be simply referred to as "SXXX".

In S402, the CPU 203 analyzes the received print job.

In S403, the CPU 203 generates the job management data 300 based on the result of analysis in S402.

In S404, the CPU 203 analyzes the job management data 300 generated in S403.

In S405, the CPU 203 determines whether or not the printing instructed in the print job received in S401 is equivalent to the CD label printing. Specifically, based on the result of analysis of the job management data 300 in S404, the CPU 203 determines whether or not a value stored in the sheet type 360 is a value that indicates the CD label printing. The processing proceeds to S406 in the case where a result of determination in this step is true. On the other hand, the processing proceeds to S407 in the case where the result of determination in this step is false.

In S406, the CPU 203 executes CD label print processing. Details of the CD label print processing will be described later (see FIG. 5).

In S407, the CPU 203 executes print processing other than the CD label printing.

<CD Label Print Processing Executed by Printing Apparatus 100>

Figure 5:
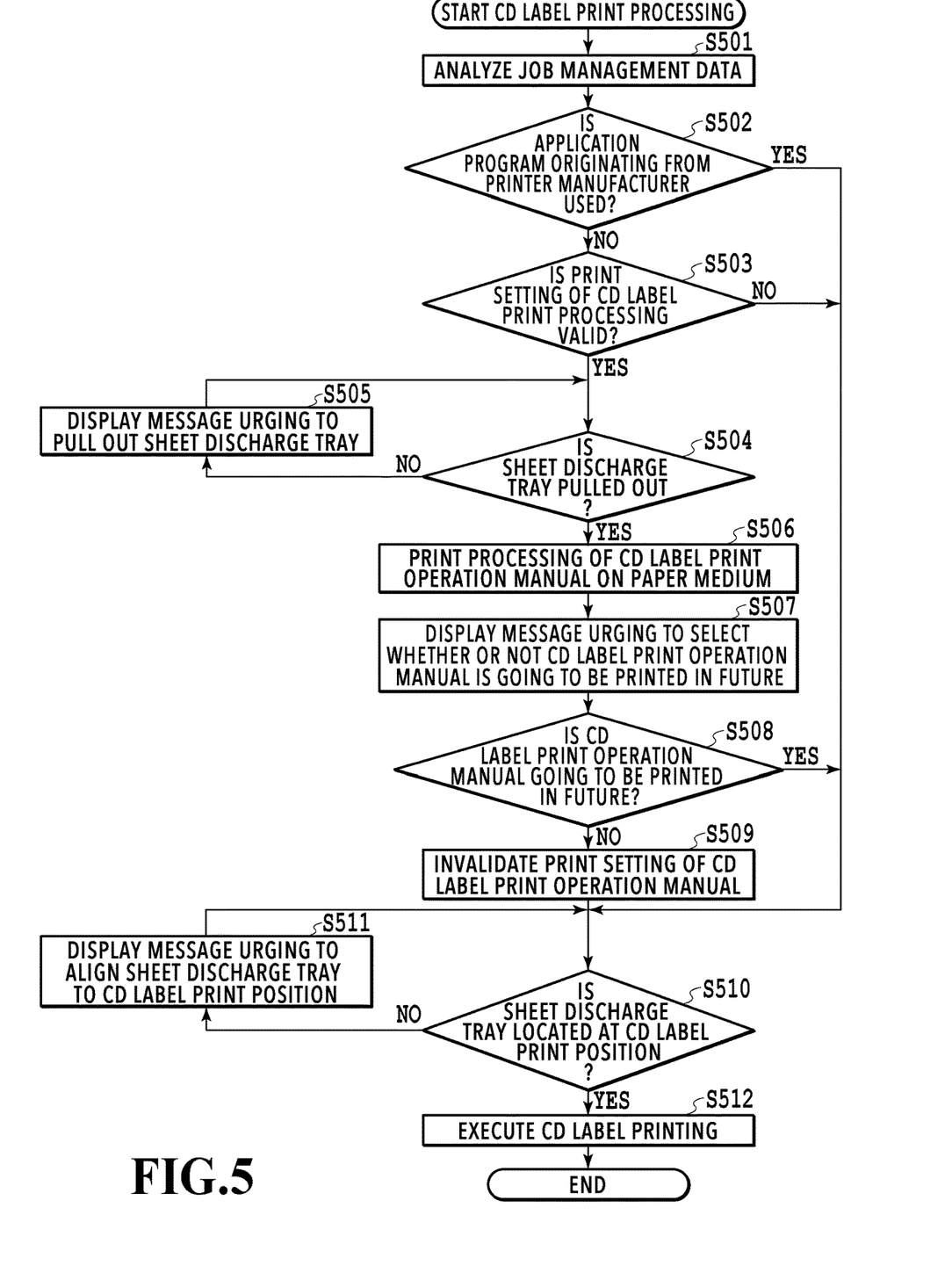
FIG. 5 is a flowchart of CD label print processing.

The CD label print processing in the embodiment of the present invention will be described below with reference to FIG. 5. FIG. 5 is a detailed flowchart showing the CD label print processing executed in S406 of FIG. 4.

In S501, the CPU 203 analyzes the job management data 300.

In S502, the CPU 203 determines whether or not the print job is generated by using the application program originating from the manufacturer of the printing apparatus 100 based on the result of analysis in S501. Specifically, the CPU 203 determines whether or not a value stored in the job submission application 320 of the job management data 300 analyzed by the CPU 203 is a value that indicates the printer application program originating from the printer manufacturer. In the case where a result of determination in this step is true, the processing proceeds to S510 because the operation manual for printing on the CD label can be displayed by means of a UI screen of the job submission application. On the other hand, the processing proceeds to S503 in the case where the result of determination in this step is false.

In S503, the CPU 203 determines whether or not the print setting of the CD label print processing is valid. Specifically, the CPU 203 determines whether or not a value of the print setting of the CD label print operation manual stored in the ROM 205 is a value indicating validity. The processing proceeds to S504 in the case where a result of determination in this step is true. On the other hand, the processing proceeds to S510 in the case where the result of determination in this step is false.

In S504, the CPU 203 determines whether or not the CD label print operation manual can be printed on a paper medium, or more specifically, whether or not the sheet discharge tray 104 is pulled out. The determination in this step is carried out based on a result of detection by the sensor provided to the printer unit 212. The processing proceeds to S506 in the case where a result of determination in this step is true. On the other hand, the processing proceeds to S505 in the case where the result of determination in this step is false.

In S505, the CPU 203 displays a message on the LCD unit 103 urging to pull out the sheet discharge tray.

In S506, the CPU 203 executes the print processing of the CD label print operation manual on the paper medium.

In S507, the CPU 203 displays a message on the LCD unit 103 allowing selection as to whether or not the CD label print operation manual is going to be printed in the future. Although this embodiment allows the user to select whether or not the CD label print operation manual is going to be printed in the future, the determination as to whether not the CD label print operation manual is going to be printed may be set in advance.

In S508, the CPU 203 determines whether or not the user has selected to print the CD label print operation manual in the future. The processing proceeds to S510 in the case where a result of determination in this step is true. On the other hand, the processing proceeds to S509 in the case where the result of determination in this step is false.

In S509, the CPU 203 invalidates the print setting of the CD label print operation manual. Specifically, the CPU 203 sets the value of the print setting of the CD label print operation manual stored in the ROM 205 to a value indicating invalidity.

In S510, the CPU 203 determines whether or not the sheet discharge tray 104 is located at the CD label print position based on the result of detection by the sensor provided to the printer unit 212. The processing proceeds to S512 in the case where a result of determination in this step is true. On the other hand, the processing proceeds to S511 in the case where the result of determination in this step is false.

In S511, the CPU 203 displays a message on the LCD unit 103 urging alignment of the sheet discharge tray 104 to the CD label print position.

In S512, the CPU 203 executes the CD label printing. Specifically, in the case where the CD tray 105 is set to a predetermined position of the printing apparatus 100, the printer unit 212 conveys the tray 105 and the printer unit 212 executes the printing in a region of the conveyed tray 105 where the CD is mounted. Here, if the CD tray 105 is not set to the printing apparatus 100, the printing is not executed in S512 as a consequence of judgment as a print error.

Meanwhile, the operation manual printed in S506 describes a method of setting the tray 105 as an operation for printing on the CD label. In other words, the CD label printing is executed in S512 based on a premise that the operation described in the operation manual is carried out by the user.

Effects of the Embodiment

Figure 6:
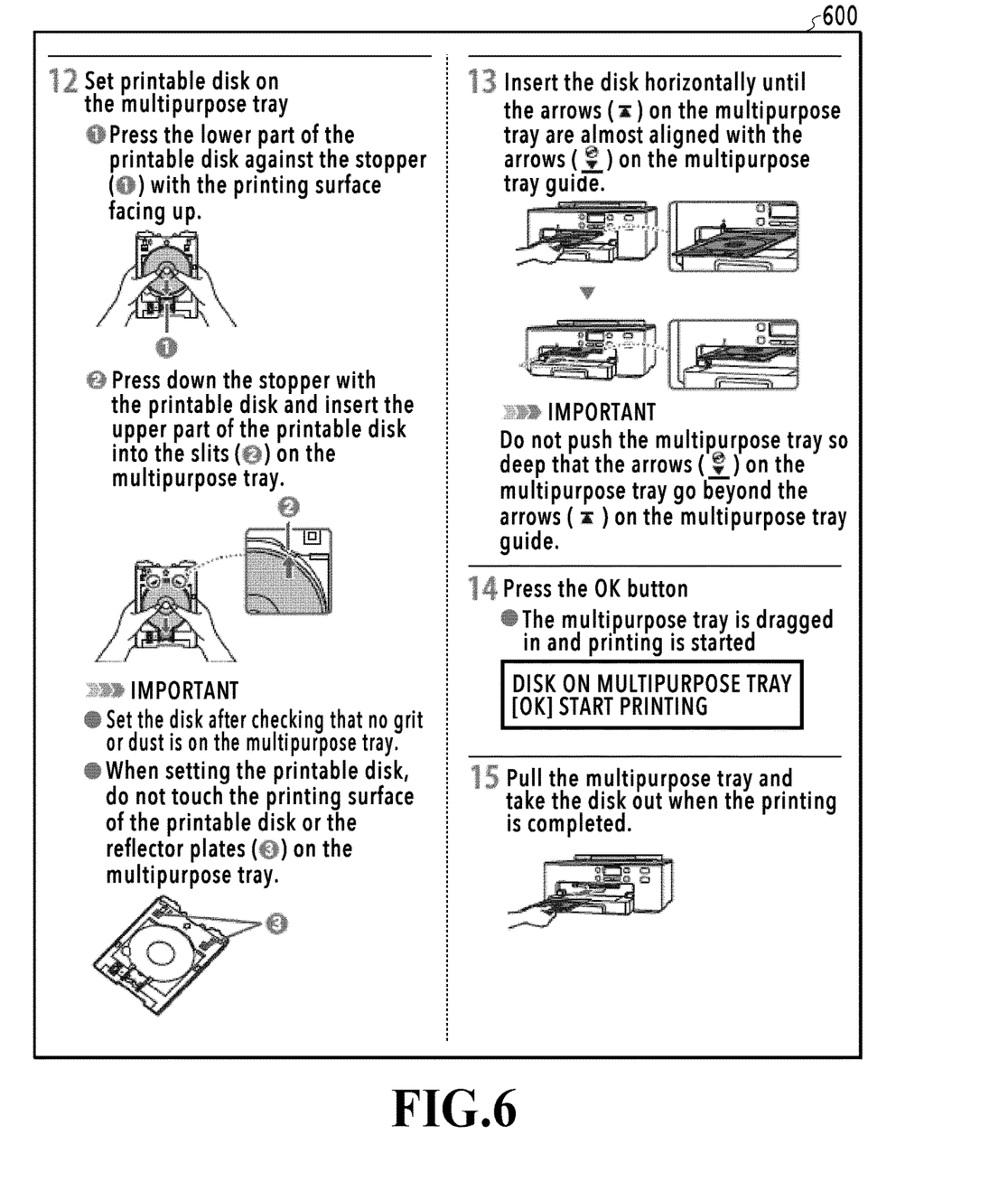
FIG. 6 is an excerpt from a CD label print operation manual.

FIG. 6 is an excerpt 600 of the CD label print operation manual according to the embodiment of the present invention. This embodiment assumes the case where the application program originating from the printer manufacturer is not used for generating the print job, and the printing apparatus 100 adapted to the CD label printing is not equipped with a large LCD unit or a large-capacity storage device. According to this embodiment, an operating method for the CD label printing in that case can be presented to the user by printing the CD label print operation manual on the paper medium.

In addition, according to this embodiment, only a portion of the CD label print operation manual is printed on the paper medium. To be more precise, only a portion of data describing a procedure that requires a complicated operation is stored in the ROM 205, and only the page corresponding to this portion is printed on the paper medium. In this way, it is possible to present the operating method for the CD label printing that requires the complicated operation to the user even in the case where the printing apparatus 100 has a small storage capacity and is unable to store the entire data of the CD label print operation manual in the printing apparatus 100.

Other Embodiments

Although the above-described embodiment has discussed the CD label printing as an example of the special print medium other than paper, such a special print medium may be any of a plastic card, a magnet sheet, a nail seal, and the like instead.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to one embodiment of the present invention, it is possible to present an operating method for print on a special print medium to a user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-012602, filed Jan. 29, 2020, which is hereby incorporated by reference wherein in its entirety.

What is claimed is:

1. A printing apparatus configured to print on print media including a paper medium and a special print medium other than the paper medium, comprising:
   an analysis unit configured to analyze a print job; and
   a determination unit configured to determine whether or not the print job is a job to cause execution of printing on the special print medium, the determination being made based on a result of analysis by the analysis unit, wherein
   based on the determination by the determination unit that the print job is the job to cause execution of printing on the special print medium, an operation manual in a case of printing on the special print medium is printed on the paper medium, and
   after the operation manual is printed, the printing on the special print medium is executed based on a premise that a prescribed operation is carried out by a user.

2. The printing apparatus according to claim 1, further comprising:
   a second determination unit configured to determine whether or not an application program originating from a manufacturer of the printing apparatus is used to generate the print job, the determination being made based on the result of analysis by the analysis unit, wherein
   the operation manual is printed on the paper medium in a case where a result of determination by the determination unit is true and a result of determination by the second determination unit is false.

3. The printing apparatus according to claim 2, further comprising:
   a generation unit configured to generate structure data for managing attribute information on the print job based on the result of analysis by the analysis unit; and
   a second analysis unit configured to analyze the structure data, wherein
   the second determination unit determines whether or not the application program originating from the manufacturer of the printing apparatus is used to generate the print job, the determination being made based on a result of analysis by the second analysis unit.

4. The printing apparatus according to claim 3, wherein information on a type of an application program used to generate the print job is stored in the structure data.

5. The printing apparatus according to claim 3, wherein information on a type of a print medium of a print target is stored in the structure data.

6. The printing apparatus according to claim 1, further comprising:
   a third determination unit configured to determine whether a setting to print the operation manual on the paper medium is valid or invalid based on setting information stored in a storage unit in a case of printing the operation manual on the paper medium, wherein
   the operation manual is printed on the paper medium in a case where the third determination unit determines that the setting to print the operation manual on the paper medium is valid.

7. The printing apparatus according to claim 6, wherein a message allowing the user to select as to whether or not the operation manual is going to be printed in a future after printing the operation manual on the paper medium is displayed on a display unit.

8. The printing apparatus according to claim 1, further comprising:
   a fourth determination unit configured to determine whether or not a sheet discharge tray is pulled out in the case of printing the operation manual on the paper medium, wherein
   a message urging the user to pull out the sheet discharge tray is displayed on a display unit in a case where a result of determination by the fourth determination unit is false.

9. The printing apparatus according to claim 1, further comprising:
   a fifth determination unit configured to determine whether or not a sheet discharge tray is located at a suitable position for the printing on the special print medium in a case of executing the printing on the special print medium, wherein
   a message urging the user to align the sheet discharge tray to a position suitable for the printing on the special print medium is displayed on a display unit in a case where a result of determination of the fifth determination unit is false.

10. The printing apparatus according to claim 1, wherein only a content concerning the printing on the special print medium is printed on the paper medium in the case of printing the operation manual on the paper medium.

11. The printing apparatus according to claim 10, further comprising:
    a storage unit configured to store data on the content.

12. The printing apparatus according to claim 1, wherein
the prescribed operation includes an operation to set a tray for mounting the special print medium to the printing apparatus, and
the printing on the special print medium is executed by conveying the set tray.

13. The printing apparatus according to claim 1, wherein the special print medium is a disk-shaped print medium.

14. The printing apparatus according to claim 1, wherein the special print medium is at least any one of a plastic card, a magnet sheet, and a nail seal.

15. A method of controlling a printing apparatus configured to print on print media including a paper medium and a special print medium other than the paper medium, comprising:

analyzing a print job as an analyzing step; and determining, as a determining step, whether or not the print job is a job to cause execution of printing on the special print medium, the determination being made based on a result of analysis in the analyzing step, wherein based on the determination in the determining step that the print job is the job to cause execution of printing on the special print medium, an operation manual in a case of printing on the special print medium is printed on the paper medium, and after the operation manual is printed, the printing on the special print medium is executed based on a premise that a prescribed operation is carried out by a user.

16. A non-transitory computer-readable storage medium storing a program which causes a computer to perform a method of controlling a printing apparatus, the method comprising:

analyzing a print job as an analyzing step; and determining, as a determining step, whether or not the print job is a job to cause execution of printing on the special print medium, the determination being made based on a result of analysis in the analyzing step, wherein based on the determination in the determining step that the print job is the job to cause execution of printing on the special print medium, an operation manual in a case of printing on the special print medium is printed on the paper medium, and after the operation manual is printed, the printing on the special print medium is executed based on a premise that a prescribed operation is carried out by a user.

* * * * *